US009268931B2

(12) United States Patent
Subramaniam et al.

(10) Patent No.: US 9,268,931 B2
(45) Date of Patent: Feb. 23, 2016

(54) GATE KEEPER COOKIE

(75) Inventors: Sarat Chandra Subramaniam, Bellevue, WA (US); Christian Roy, Redmond, WA (US); Venkatesh Veeraraghavan, Seattle, WA (US); Nicholas Carl Sturm, Redmond, WA (US); Titus Constantin Miron, Seattle, WA (US); Matthew Taylor Cohen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 667 days.

(21) Appl. No.: 13/596,898

(22) Filed: Aug. 28, 2012

(65) Prior Publication Data

US 2013/0332606 A1 Dec. 12, 2013

Related U.S. Application Data

(60) Provisional application No. 61/658,703, filed on Jun. 12, 2012.

(51) Int. Cl.
*G06F 15/173* (2006.01)
*G06F 21/41* (2013.01)
*H04L 29/06* (2006.01)

(52) U.S. Cl.
CPC ............ *G06F 21/41* (2013.01); *H04L 63/0815* (2013.01)

(58) Field of Classification Search
USPC ........................................................ 709/225
See application file for complete search history.

(56) References Cited

U.S. PATENT DOCUMENTS 6,421,768 B1 * 7/2002 Purpura ........................ 711/164
7,137,006 B1 * 11/2006 Grandcolas et al. .......... 713/180
7,444,666 B2 * 10/2008 Edwards et al. ................... 726/1
7,673,045 B1 * 3/2010 Battle et al. .................... 709/225
7,793,095 B2 * 9/2010 Hardt ............................ 713/155

(Continued)

OTHER PUBLICATIONS

Oracle. (2010). Chapter 16 Implementing Cross-Domain Single Sign-On with Cookie Hijacking Prevention. In Sun OpenSSO Enterprise 8.0 Deployment Planning Guide. Redwood Shores, CA: Oracle Press. Retrieved from https://web.archive.org/web/20120427212637/http://docs.oracle.com/cd/E19575-01/820-3746/index.html.*

(Continued)

*Primary Examiner* — Kristie Shingles
*Assistant Examiner* — Timothy Sowa
(74) *Attorney, Agent, or Firm* — Julie Kane Akhter; Tom Wong; Micky Minhas

(57) ABSTRACT

A method for sign-on and sign-out for a computer system. The method includes receiving a first sign-on request for the computer system and obtaining, from the first sign-on request, a first user identifier where the first user identifier corresponds to a first user for the computer system. The method then includes obtaining, from the first sign-on request, a first uniform resource locator (URL) and determining whether the first URL includes a first root name for the computer system. When a determination is made that the first URL includes the first root name for the computer system a first cookie associated with the first user is issued and a first sub-domain name is obtained from the first URL. Also, a second cookie may be issued associated with the first sub-domain name and, when the first cookie and the second cookie are issued, the first user may sign-on to the computer system. In one or more embodiments, the method may include receiving a sign-out request.

21 Claims, 7 Drawing Sheets

(56) References Cited

U.S. PATENT DOCUMENTS

| | | | | |
|---|---|---|---|---|
| 8,805,987 | B1* | 8/2014 | Kirkham et al. | 709/223 |
| 2005/0154887 | A1* | 7/2005 | Birk et al. | 713/168 |
| 2006/0031494 | A1* | 2/2006 | Marcus et al. | 709/225 |
| 2007/0150603 | A1* | 6/2007 | Crull et al. | 709/227 |
| 2009/0282239 | A1* | 11/2009 | Doleh | 713/155 |
| 2011/0225263 | A1* | 9/2011 | Sureshchandra et al. | 709/217 |
| 2011/0252465 | A1* | 10/2011 | Miller et al. | 726/8 |
| 2011/0296036 | A1* | 12/2011 | Canning et al. | 709/228 |
| 2012/0005738 | A1* | 1/2012 | Manini et al. | 726/7 |
| 2012/0096068 | A1* | 4/2012 | Canning et al. | 709/203 |
| 2012/0144024 | A1* | 6/2012 | Lee | 709/224 |
| 2012/0311167 | A1* | 12/2012 | Feng et al. | 709/229 |
| 2013/0152212 | A1* | 6/2013 | Kennish | 726/26 |
| 2013/0212665 | A1* | 8/2013 | Goyal et al. | 726/8 |
| 2013/0246630 | A1* | 9/2013 | Exton et al. | 709/227 |

OTHER PUBLICATIONS

Pouttu-Clarke. (Jan. 19, 2005). Cross Domain Cookie Provider. TheServerSide.com. Retrieved from http://www.theserverside.com/news/thread.tss?thread_id=31258.*

Oracle. (Jan. 30, 2012). 11 Mobile Single Sign-On. In Oracle® Application Server Wireless Administrator's Guide. Redwood Shores, CA: Oracle Press. Retrieved from http://web.archive.org/web/20120130021414/http://docs.oracle.com/cd/B14099_19/wireless.1012/b13820/msso.htm.*

Conkle. (Sep. 17, 2010). AD FS: How to Invoke a WS-Federation Sign-Out. Microsoft TechNet. Retrieved from http://social.technet.microsoft.com/wiki/contents/articles/1439.ad-fs-how-to-invoke-a-ws-federation-sign-out.aspx.*

* cited by examiner

300

302

| Non-vanity Domain Sign-on |
|---|
| Issue gatekeeper cookie for root domain |
| Issue sub-domain cookie for each subdomain |

304

| Non-vanity Domain Sign-out |
|---|
| Clear gatekeeper cookie |
| Expire subdomain cookies |

| Vanity Domain Sign-on |
|---|
| Issue vanity domain cookie for each vanity domain |
| Issue / update vanity domain tracking cookie |

404

| Vanity Domain Sign-out |
|---|
| Clear each vanity domain cookie |
| Clear vanity domain tracking cookie |

FIG.4

GATE KEEPER COOKIE

CROSS-REFERENCE TO RELATED APPLICATIONS

The present application claims priority to U.S. Provisional Patent Application No. 61/658,703 titled "Gate Keeper Cookie" filed Jun. 12, 2012, the disclosure of which is hereby incorporated by reference in its entirety.

BACKGROUND

Single sign-on web services permit a user to sign-on to multiple websites using one sign-on request. Single sign-on web services also typically permit a user to sign-out from the multiple websites using a single sign-out request.

One type of system that may be used with single sign-on web services is a multi-tenant document and information sharing system. In a multi-tenant document and information sharing system, a user may use a single sign-on request to sign in to the system and may also be signed-in to one or more tenant accounts in the system. When signing out of a multi-tenant document and information sharing system, a user may need to individually sign out of each of the tenant accounts into which the user is signed.

SUMMARY

Embodiments of the disclosure are directed to a method for sign-on and sign-out for a computer system including: on a server computer, receiving a first sign-on request for the computer system; obtaining, from the first sign-on request, a first user identifier, the first user identifier corresponding to a first user for the computer system; obtaining, from the first sign-on request, a first uniform resource locator (URL); determining whether the first URL includes a first root name for the computer system; when a determination is made that the first URL includes the first root name for the computer system: issuing a first cookie; associating the first cookie with the first user; obtaining a first sub-domain name from the first URL; issuing a second cookie, the second cookie being different from the first cookie; associating the second cookie with the first sub-domain name; and when the first cookie and the second cookie are issued, signing-on the first user to the computer system.

In another embodiment, a method for sign-on and sign-out for a computer system includes: on a server computer, receiving a first sign-on request for the computer system; obtaining, from the first sign-on request, a first user identifier, the first user identifier corresponding to a first user for the computer system; obtaining, from the first sign-on request, a first uniform resource locator (URL); determining whether the first URL includes a first root name for the computer system; when a determination is made that the first URL does not include the first root name for the computer system: obtain a first domain name from the first URL; issuing a first cookie, the first cookie being a cookie; associating the first cookie with the first domain name; issuing a second cookie; storing in the second cookie, the first domain name; and when the first cookie and the second cookie are issued, signing-on the first user to the computer system.

In yet another embodiment, a computer readable storage memory includes instructions that, when executed by an electronic computing device, cause the electronic computing device to: receive a first sign-on request for a computer system; obtain, from the first sign-on request, a first user identifier, the first user identifier corresponding to a first user for the computer system; obtain, from the first sign-on request, a first uniform resource locator (URL); determine whether the first URL includes a first root name for the computer system; when a determination is made that the first URL includes the first root name for the computer system: issue a first cookie, the first cookie being a cookie; associate the first cookie with the first user; obtain a first sub-domain name from the first URL; issue a second cookie, the second cookie being different from the first cookie; associate the second cookie with the first sub-domain name; and when the first cookie and the second cookie are issued, sign-on the first user to the computer system; when a determination is made that the first URL does not include the first root name for the computer system: obtain a first domain name from the first URL; issue a third cookie; associate the third cookie with the first domain name; issue a fourth cookie; store in the fourth cookie, the first domain name; and when the third cookie and the fourth cookie are issued, sign-on the first user to the computer system; receive a sign-out request for the computer system; obtain, from the sign-out request, a second user identifier; obtain, from the sign-out request, a second URL; determine whether the second user identifier is the same the first user identifier; determine whether the second URL includes a second root name; when a determination is made that the second user identifier is the same as the first user identifier and when a determination is made that the second root name is the same as the first root name, clear the first cookie, the clearing of the first cookie signing the first user out of the computer system; and when a determination is made that the second user identifier is the same as the first user identifier and when it is determined that the second URL does not include the first root name: obtain the fourth cookie; obtain the first domain name from the fourth cookie; obtain the third cookie using the first domain name; clear the third cookie; determine whether the fourth cookie includes any additional sub-domain names for which cookies have not been cleared; and when a determination is made that the fourth cookie does not includes any additional sub-domain names for which cookies have not been cleared, clear the fourth cookie.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

FIG. 3 shows example procedures for sign-on and sign-out of non-vanity domains.

FIG. 4 shows example procedures for sign-on and sign-out of vanity domains.

DETAILED DESCRIPTION

The present application is directed to systems and methods for using a single sign-on/single sign-out web service with a multi-tenant document and information sharing system.

A multi-tenant document and information sharing system provides web hosting services for a plurality of tenants. As used in this disclosure, a tenant is a user who reserves web hosting services on a multi-tenant document and information sharing system. The systems and methods permit a user to sign-onto the multi-tenant document and information sharing system using a single sign-on request and/or to sign out of the multi-tenant document and information sharing system using a single sign-out request, without needing to sign out of individual tenant domains.

The systems and methods are provided for both non-vanity tenant domains and for vanity tenant domains. A non-vanity tenant domain is associated with a uniform resource locator (URL) of the multi-tenant document and information sharing system. A vanity domain is a tenant domain having a name personalized for a user. A URL associated with the vanity domain may not include an identification of the multi-tenant document and information sharing system.

In order to implement single sign-on and single sign-out of the multi-tenant document and information sharing system, a plurality of computer cookies are used. A cookie is a file storing data related to website access by a client computer. Typically, a browser application running on the client computer accesses and manages the cookies.

As explained in detail herein, a gatekeeper cookie is associated with access to non-vanity domains of the multi-tenant document and information sharing system. A vanity domain cookie is associated with access to a vanity domain.

Figure 1:
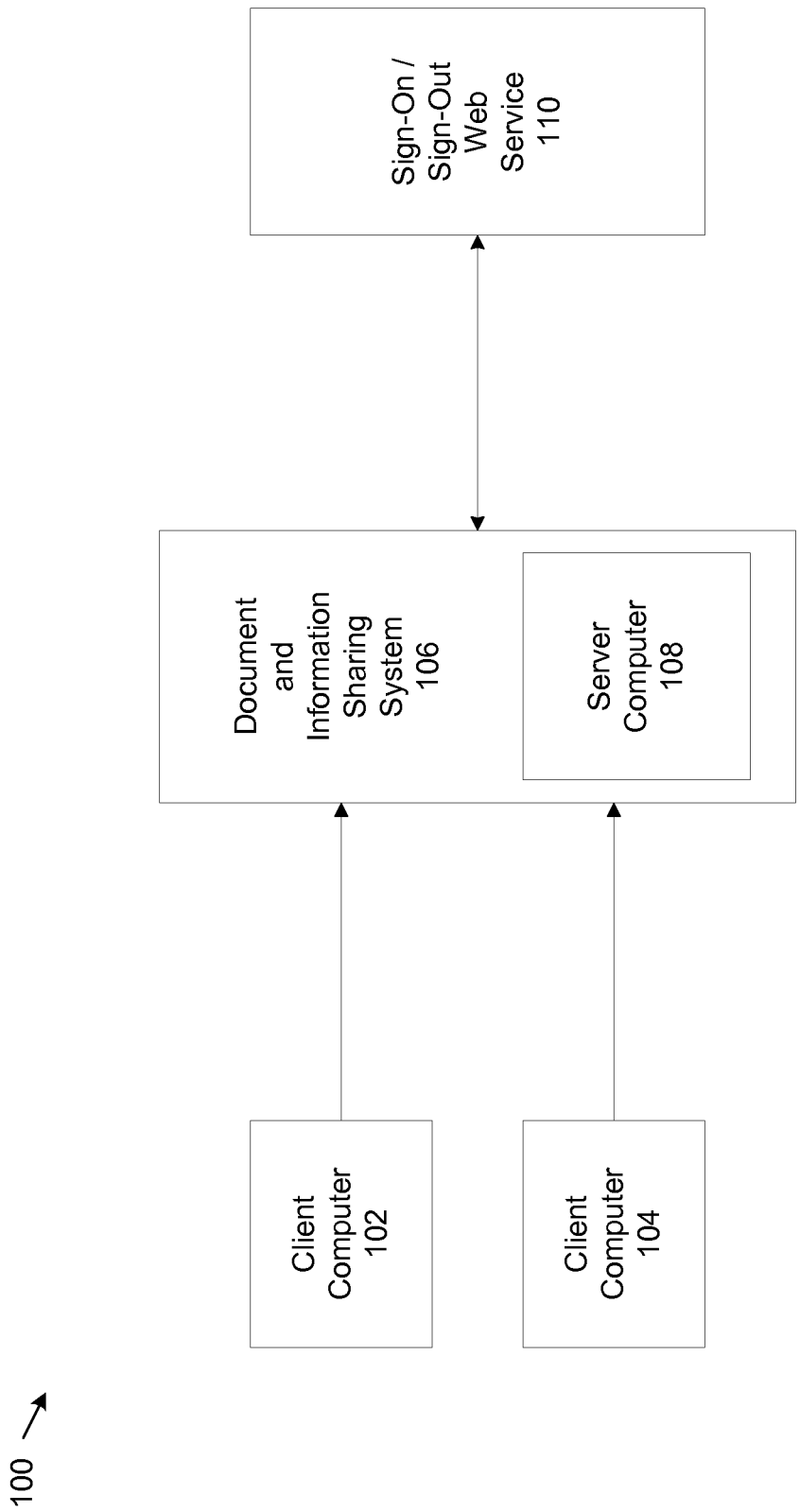
FIG. 1 shows an example system that supports implementation of single sign-on and single sign-out for a multi-tenant document and information sharing system.

FIG. 1 shows an example system 100 for implementing single sign-on and single sign-out for a multi-tenant document and information sharing system 106. The example system 100 includes client computers 102, 104, document and information sharing system 106 and sign-on/sign-out web service 110.

The document and information sharing system 106 is a system that provides file sharing among users and also provides website hosting. In examples, the document and information sharing system 106 may also provide email and calendars, web conferencing and web applications. An example of the document and information sharing system 106 is the Sharepoint® Online document and information sharing system from Microsoft Corporation of Redmond, Wash. Other examples are possible.

The example document and information sharing system 106 includes server computer 108 and typically comprises a plurality of server computers. The plurality of server computers may reside on one or more server farms. Users on client computers 102, 104 may share files and access tenant websites on the document and information sharing system 106.

The sign-on/sign-out web service 110 permits users to sign-on to and sign-out from multiple websites using a single sign-on or sign-out request. When a user signs in to a website, the sign-on/sign-out web service 110 authenticates the user and keeps track of the website that the user is signed into. When the same user access another website, the sign-on/sign-out web service 110 notifies the other website that the user has already been authenticated, thereby obviating a need for user to sign-on to the other website.

An example of the sign-on/sign-out web service 110 is the Windows Live® single sign-on service from Microsoft Corporation of Redmond, Wash. Another example is the OrgID single sign-on/sign-out service.

Figure 2:
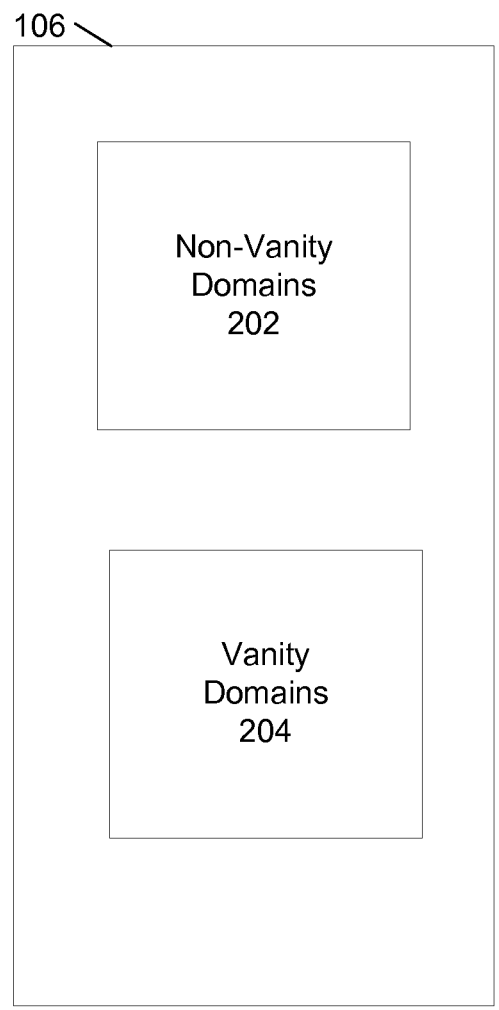
FIG. 2 shows example components of the multi-tenant document and information sharing system of FIG. 1.

FIG. 2 shows that the document and information sharing system 106 includes non-vanity domains 202 and vanity domains 204. The non-vanity domains 202 are associated with a root domain of the document and information sharing system 106. The vanity domains 204 are associated with tenant websites hosted on the document and information sharing system 106.

Each tenant website for a vanity domain is identified by a unique URL that typically includes a user selected name, but that does not include a name of the root domain. For example, a URL for a non-vanity domain may include the string "company_x.sharepoint.com," where "sharepoint" is an example root domain of the document and information sharing system 106 and "company_x" is a sub-domain. Another example URL for a non-vanity domain may include the string "company_y.sharepoint.com," where "sharepoint" is the root domain and "company_y" is a sub-domain.

In contrast, URLs for vanity domains may include the strings "company_x.com" and "company_y.com". For the vanity domains, the example root domain "sharepoint" is not included in the URL.

FIG. 3 shows example procedures 300 for sign-on and sign-out of non-vanity domains. For non-vanity domain sign-on 302, a gatekeeper cookie is issued for a root domain for the document and information sharing system 106 and a sub-domain cookie is issued for each sub-domain. When a user, for example a user on client computer 102, signs-on to the document and information sharing system 106, a request is sent to sign-on/sign-out web service 110 to authenticate the user. The sign-on/sign-out web service 110 prompts the user for credentials, typically a user ID and a password.

When the user's credentials are authenticated, the gatekeeper cookie is issued for the user. The gatekeeper cookie is a file that includes user sign-on information. The gatekeeper cookie is issued to the root domain for the document and information sharing system 106. For example, the gatekeeper cookie may be issued to a domain that includes the name "sharepoint."

The sign-on request may also include a sub-domain name, for example a sub-domain that is associated with a tenant website on the document and information sharing system 106. When the sign-on request includes the sub-domain name, in addition to issuing the gatekeeper cookie to the root domain, the document and information sharing system 106 issues a cookie to the sub-domain name. For each additional non-vanity sign-on request to a different sub-domain name, corresponding to a different tenant website hosted on the document and information sharing system 106, the document and information sharing system 106 issues a cookie for the additional sub-domain name.

The gatekeeper cookie and the sub-domain cookies include a user name from the sign-on request and a cryptographic signature. The cryptographic signature comprises an encryption of the one or more elements of the sign-on request. For example, the cryptographic signature may comprise an encryption of the user name. The cryptographic signature is used to prevent unauthorized tampering with the gatekeeper cookie and with the sub-domain cookies.

For non-vanity domain sign-out 304, the gatekeeper cookie is cleared and each sub-domain cookie is expired. The gatekeeper cookie is associated with the root domain and contains the user name used to sign-on to the document and information sharing system 106 and the cryptographic signature used to prevent tampering. Because non-vanity domain sign-on requires a gatekeeper cookie to be issued, clearing the gatekeeper cookie effectively signs the user out of the document and information sharing system 106.

Sign-out from the non-vanity domain also initiates an expiration of each sub-domain cookie that was issued when the user signed in to the non-vanity domain. In examples, a timer is started to initiate the expiration for each sub-domain cookie in the non-vanity domain. In examples, sub-domain cookies are persistent cookies and may have a lifetime of 10 hours, although other lifetimes are possible. If the user signs-on to the non-vanity domain before a sub-domain cookie expires, the user is re-signed in to all sub-domains for which the sub-domain cookies have not yet expired.

FIG. 4 shows example procedures 400 for sign-on and sign-out of vanity domains. For vanity domain sign-on 402, a vanity domain cookie is issued for each vanity domain that a user signs-on to, for example "company_x.com" and "company_y.com." In examples, each vanity domain cookie includes a user ID and a cryptographic signature, typically associated with the user ID, to prevent tampering. In addition, when a user signs-on to a first vanity domain, a vanity domain tracking cookie is issued. The vanity domain tracking cookie stores a list of vanity domains that the user is signed-in to. For each vanity domain to which a signs-on, the vanity domains that the user signs-on to are added to the list of vanity domains in the vanity domain tracking cookie.

For vanity domain sign-out 404, each vanity domain cookie from the vanity domain sign-on 402 is cleared. Because a root cookie is not associated with a vanity domain, clearing a vanity domain cookie signs the user out of the vanity domain. When a user signs-out of a vanity domain, the vanity domain tracking cookie is used to issue sign-out requests to each vanity domain listed in the vanity domain tracking cookie. Typically, sign-out requests are issued via redirect commands to each vanity domain listed in the vanity domain tracking cookie. In addition, after the vanity domain cookies are cleared, the vanity domain tracking cookie is also cleared.

In examples, some systems, for example the document and information sharing system 106, have a time limit in which a user must be signed out. The time limit typically starts from when the sign-out request is received. Using the redirect commands, each vanity domain cookie is cleared in turn. However, depending on the number of vanity domains a user has signed-in to and a value of the time limit, it is possible that all vanity domain cookies may not be cleared before the time limit expires. The time limit is typically determined by the sign-on/sign-out web service being used, for example sign-on/sign-out web service 110.

In examples, when a sign-out occurs, a message, typically in the form of a dialog box, is displayed to the user, indicating to the user that sign-out has occurred. In examples, an image may be displayed instead of a dialog box. The image may include a notification that the sign-out has occurred. Other methods of notification are possible.

Figure 5:
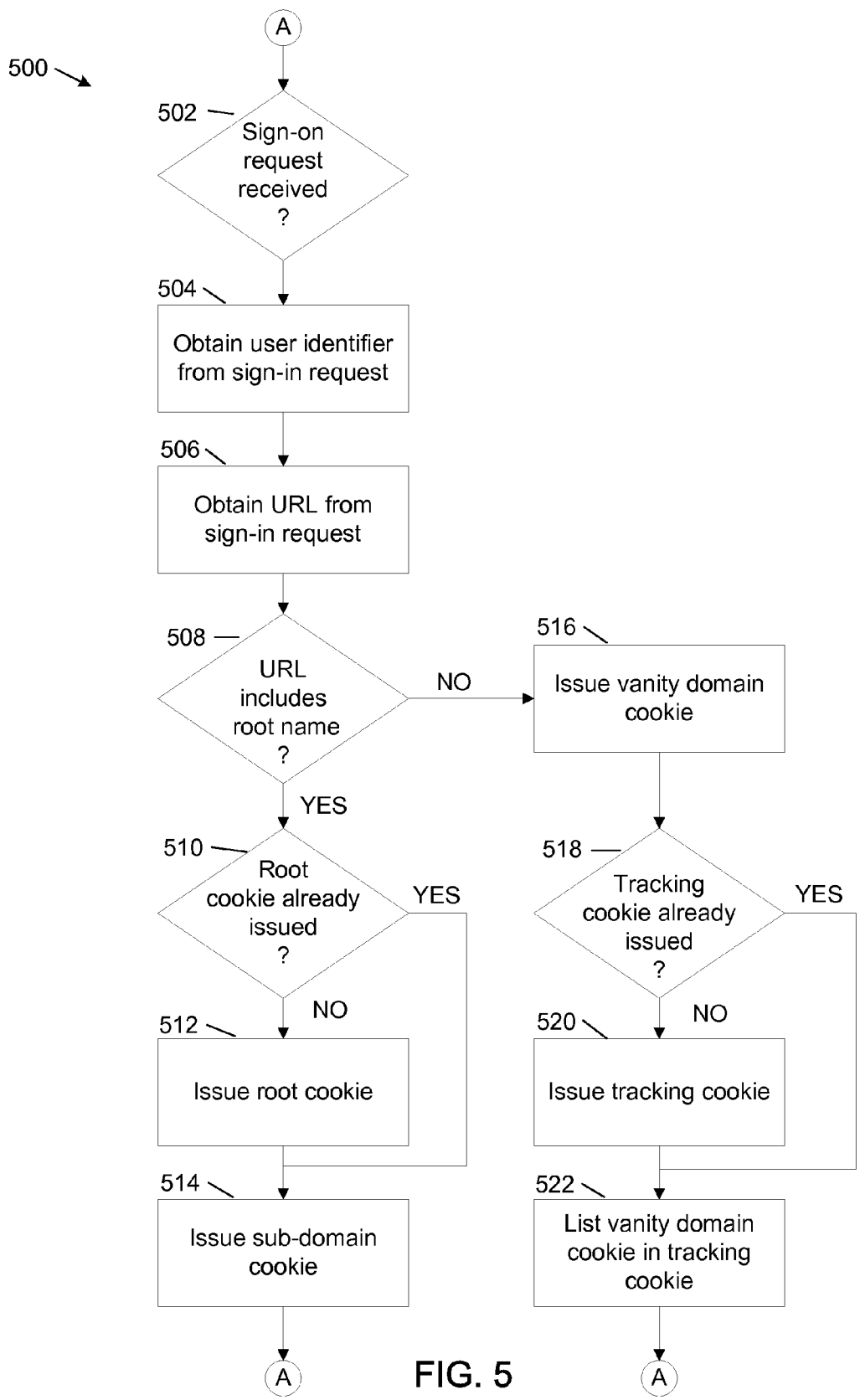
FIG. 5 shows an example flowchart of a method for signing-on to a tenant website hosted on the multi-tenant document and information sharing system of FIG. 1.

FIG. 5 shows an example flowchart of a method 500 for signing-on to a tenant website hosted on the document and information sharing system 106. The tenant website may be located in a vanity domain or a non-vanity domain of the document and information sharing system 106. In the example method 500, the document and information sharing system 106 is Sharepoint® Online.

At operation 502, a sign-on request is received from a user at client computer 102. The sign-on request includes a user identifier and a URL for the tenant website. The user identifier is typically a numeric or an alphanumeric identifier that identifies the user. At operation 504, the user identifier is obtained from the sign-on request.

At operation 506, the URL is obtained from the sign-on request. In examples, the sign-on request may be for a non-vanity domain or a vanity domain. When the sign-on request is for a non-vanity domain, the URL in the sign-on request includes a root name associated with the document and information sharing system 106. For example, for Sharepoint@ Online, the root name may be "sharepoint." In addition, for non-vanity domains, a sub-domain name is also obtained from the URL in the sign-on request. The sub-domain name typically corresponds to the tenant website. For example, if the URL is "company-x.sharepoint.com," company-x is the sub-domain name.

When the sign-on request is for a vanity domain, the URL in the sign-on request does not include a root name. Instead, the URL includes a name of the vanity domain. For example, the URL for a vanity domain may be "website_z.com." For this example, websize_z is the name of the vanity domain.

At operation 508, a determination is made as to whether the URL includes the root name. When a determination is made at operation 508 that the URL includes the root name, indicating that the sign-on request is for a non-vanity domain, at operation 510, a determination is made as to whether a root cookie has already been issued. A root cookie may have been already been issued during a previous sign-on request for the user to the non-vanity domain.

When a determination is made that a root cookie has not been issued for the user, at operation 512, a root cookie is issued for the user. For non-vanity domains, the root cookie indicates that the user has signed-in to the document and information sharing system 106. When a determination is made that the root cookie has already been issued, control passes to operation 514.

At operation 514, a sub-domain cookie is issued for the sub-domain name in the URL. The sub-domain cookie includes the user name and a cryptographic signature to prevent tampering. The cryptographic signature is typically a cryptographic representation of the user identifier. Issuing the sub-domain cookie in conjunction with the root cookie being issued, signs the user into the tenant website specified in the URL of the sign-on request. Control then returns to operation 502 to wait for another possible sign-on request.

When a determination is made at operation 508 that the URL does not include a root name, at operation 516, a vanity domain cookie is issued. The vanity domain cookie corresponds to the name of the vanity domain, in this example website_z.

At operation 518, a determination is made as to whether a tracking cookie has already been issued for the user. The tracking cookie is issued for vanity domains to keep track of vanity domains that have been signed into. The tracking cookie is used to identify vanity domains during the sign-out process, as discussed later herein. The tracking cookie may have been issued during a previous sign-on request.

At operation 518, when a determination is made that the tracking cookie has not already been issued for the user, at operation 520, the tracking cookie is issued. At operation 518, when a determination is made that the tracking cookie has already been issued, control advances to operation 522.

At operation 522, the vanity domain name is stored and listed in the tracking cookie. Control then returns to operation 502 to wait for another possible sign-on request.

Figure 6:
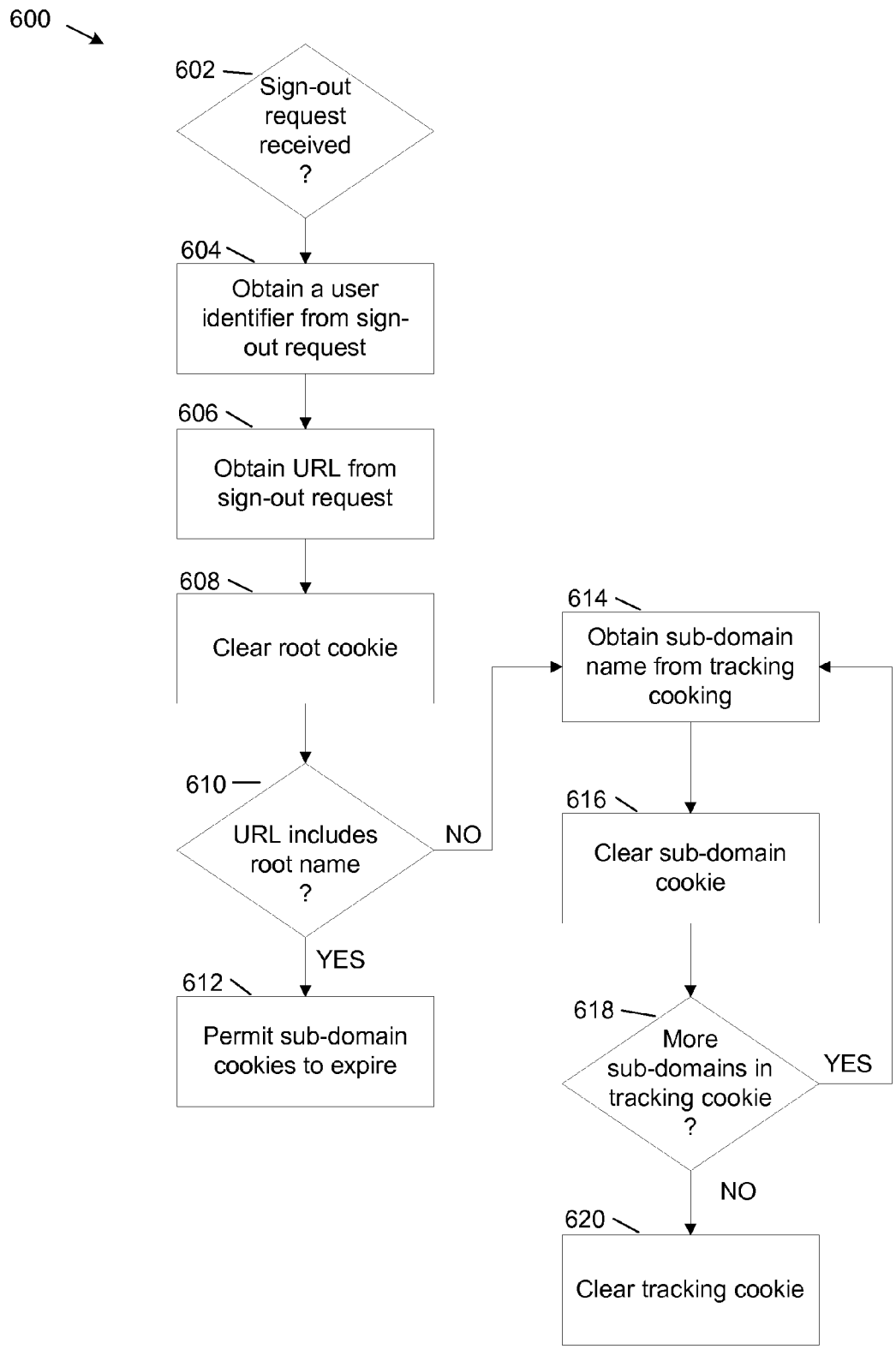
FIG. 6 shows an example flowchart of a method for signing-out from a tenant website hosted on the multi-tenant document and information sharing system of FIG. 1.

FIG. 6 shows an example flowchart of a method 600 for signing-out from the document and information sharing system 106. At operation 602, a sign-out request is received at the document and information sharing system 106. At operation 604, a user identifier is obtained from the sign-out request.

At operation 606 a URL is obtained from the sign-out request. The URL includes a domain name for the sign-out request.

At operation 608, the root cookie is cleared. Clearing the root cookie effectively signs the user out of the document and information sharing system 106, because, as discussed, for non-vanity domains, an issued root cookie is required for sign-on to the document and information sharing system 106.

At operation 610, a determination is made as to whether the URL includes the root name of the document and information sharing system 106. The URL includes the root name when the sign-out request is for a non-vanity domain.

At operation 610, when a determination is made that the URL includes the root name, for example "sharepoint," of the document and information sharing system 106, at operation 612, all sub-domain cookies associated with the root cookie are permitted to expire. An expiration time for the sub-domain cookies is configured in the document and information sharing system 106. In examples, the expiration time is set for 10 hours, although other expiration times may be used.

At operation 610, when a determination is made the URL does not include the root name, indicating that the sign-out request is for one or more vanity domains, at operation 614, a sub-domain name is obtained from the tracking cooking created during the sign-on request to the one or more vanity domains for the user.

At operation 616, the sub-domain cookie is cleared. Clearing the sub-domain cookie signs the user out of the vanity domain associated with the sub-domain cookie. However, the user may be signed-in to more vanity domains.

At operation 618, a determination is made as to whether there are any more sub-domains listed in the tracking cookie. Additional sub-domains listed in the tracking cookie indicate that the user is signed in to more vanity domains.

At operation 618, when a determination is made that there are more sub-domains listed in the tracking cookie, control returns to operation 614 and the next sub-domain is obtained from the tracking cookie. The obtained sub-domain cookie is cleared at operation 616. Then, at operation 618, another check is made as to whether there are any additional sub-domains listed in the tracking cookie.

The process of clearing sub-domain cookies at operation 616 continues until all sub-domain cookies listed in the tracking cookie are cleared, effectively signing the user out of the vanity domains. In examples, there may be a time limit in which the vanity domain sign-out needs to occur. Typically, re-direction commands are used to obtain a sub-domain cookie from the tracking cookie and clear each sub-domain cookie.

It is possible that the time limit may expire before all sub-domain cookies listed in the tracking cookie are cleared. When the time limit expires before all vanity domain cookies have been expired, in one example, an error message is returned to the user indicating that sign-out was unsuccessful for those tenants that have not yet been signed-out. In an alternative embodiment, a sign-out complete message may be sent to the user, even though the user may still be signed-in to some vanity domains. However, even though the sign-out complete message is sent to the user, operations 614-618 continue until sign-out from all vanity domains has been completed, and any errors associated with sign-out can be returned to the user at that time.

At operation 618, when it is determined that sub-domain cookies have been cleared for all sub-domain cookies listed in the tracking cookie, at operation 620, the tracking cookie is cleared.

Figure 7:
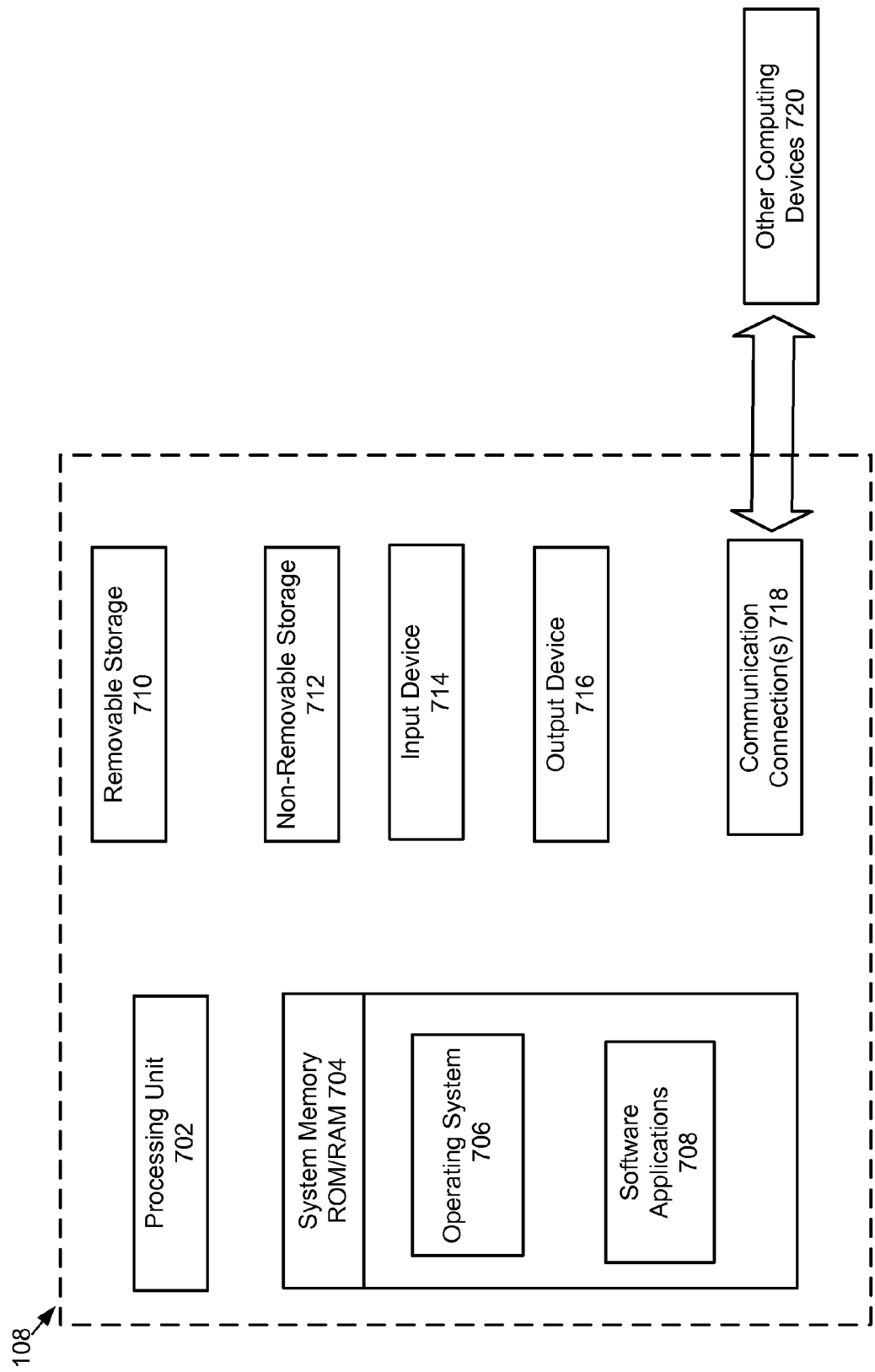
FIG. 7 shows example components of the server computer of FIG. 1.

With reference to FIG. 7, example components of server computer 108 are shown. In example embodiments, server computer 108 is a computing device. Server computer 108 can include input/output devices, a central processing unit ("CPU"), a data storage device, and a network device. Server computer 108 can also be a mobile computing device, such as a laptop, tablet, convertible, or other handheld device like a smartphone or cellular telephone.

In a basic configuration, server computer 108 typically includes at least one processing unit 702 and system memory 704. Depending on the exact configuration and type of computing device, the system memory 704 may be volatile (such as RAM), non-volatile (such as ROM, flash memory, etc.) or some combination of the two. System memory 704 typically includes an operating system 706 suitable for controlling the operation of a client computer. The system memory 704 may also include one or more software applications 708 and may include program data.

The server computer 108 may have additional features or functionality. For example, server computer 108 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 7 by removable storage 710 and non-removable storage 712. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server computer 108. Any such computer readable storage media may be part of server computer 108. Server computer 108 may also have input device(s) 714 such as keyboard, mouse, pen, voice input device, touch input device, etc. Output device(s) 716 such as a display, speakers, printer, etc. may also be included.

Consistent with embodiments of the present disclosure, the input device(s) 714 may comprise any motion detection device capable of detecting the movement or gesture of a user. For example, the input device(s) 714 may comprise a Kinect® motion capture device, from Microsoft Corporation, comprising a plurality of cameras and a plurality of microphones.

The server computer 108 may also contain communication connections 718 that allow the device to communicate with other computing devices 720, such as over a network in a distributed computing environment, for example, an intranet or the Internet. Communication connections 718 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Embodiments of the present disclosure may be practiced via a system-on-a-chip (SOC) where each or many of the components illustrated in FIG. 7 may be integrated onto a single integrated circuit. Such an SOC device may include one or more processing units, graphics units, communication units, system virtualization units and various application functionality all of which are integrated (or "burned") onto the chip substrate as a single integrated circuit. When operating via an SOC, the functionality, described above, with respect to the present disclosure may be operated via application-specific logic integrated with other components of the server computer 108 on the single integrated circuit (chip).

The various embodiments described above are provided by way of illustration only and should not be construed to limiting. Various modifications and changes that may be made to the embodiments described above without departing from the true spirit and scope of the disclosure.

What is claimed is:

1. A method for sign-on and sign-out for a computer system, the method comprising:
   on a server computer, receiving a first sign-on request for the computer system;
   obtaining, from the first sign-on request, a first user identifier, the first user identifier corresponding to a first user for the computer system;
   obtaining, from the first sign-on request, a first uniform resource locator (URL);
   determining whether the first URL includes a first root name for the computer system; and
   when a determination is made that the first URL includes the first root name for the computer system:
      issuing a first cookie;
      associating the first cookie with the first user;
      obtaining a first sub-domain name from the first URL;
      issuing a second cookie, the second cookie being different from the first cookie;
      associating the second cookie with the first sub-domain name; and
      when the first cookie and the second cookie are issued, signing-on the first user to the computer system;
   after the first user is signed into the computer system, receiving a sign-out request for the computer system;
   obtaining, from the sign-out request, a second user identifier;
   obtaining, from the sign-out request, a second URL;
   determining whether the second user identifier is the same as the first user identifier;
   determining whether the second URL includes the first root name;
   when a determination is made that the second user identifier is the same as the first user identifier and when it is determined that the second URL does not include the first root name:
      obtain the second cookie from the server computer;
      obtain the first domain name from the second cookie;
      obtain the first cookie using the first domain name;
      clear the first cookie;
      determine whether the second cookie includes any additional sub-domain names for which cookies have not been cleared; and
      when a determination is made that the second cookie does not include any additional sub-domain names for which cookies have not been cleared, clear the second cookie.

2. The method of claim 1, wherein the first cookie includes the first user identifier and a cryptographic representation of the first user identifier.

3. The method of claim 1, wherein the second cookie includes the first user identifier and a cryptographic representation of the first user identifier.

4. The method of claim 1, further comprising:
   after the first user is signed in to the computer system, receiving a sign-out request for the computer system;
   obtaining, from the sign-out request, a second user identifier;
   obtaining, from the sign-out request, a second URL;
   determining whether the second user identifier is the same the first user identifier;
   determining whether the second URL includes a second root name; and
   when a determination is made that the second user identifier is the same as the first user identifier and when a determination is made that the second root name is the same as the first root name, clearing the first cookie, the clearing of the first cookie signing the first user out of the computer system.

5. The method of claim 4, further comprising:
   after the sign-out request is received, initiating an expiration of the second cookie.

6. The method of claim 4, wherein initiating an expiration of the second cookie comprises, starting a timer to time-out the second cookie.

7. The method of claim 1 further comprising:
   receiving a second sign-on request for the computer system;
   obtaining, from the second sign-on request, a third user identifier;
   obtaining, from the second sign-on request, a third URL for the second sign-on request;
   determining whether the third URL includes the first root name for the computer system; and
   when a determination is made that the third URL includes the first root name:
      determining whether the third user identifier is the same as the first user identifier; and
      when it is determined that the third user identifier is the same as the first user identifier:
         obtaining a second sub-domain name from the third URL;
         issuing a third cookie, the third cookie being a cookie; and
         associating the third cookie with the second sub-domain name.

8. The method of claim 7, wherein the third cookie includes the first user identifier and a cryptographic representation of the first user identifier.

9. The method of claim 7, further comprising:
   receiving a sign-out request; and
   after the sign-out request is received, clearing the first cookie and initiating an expiration of the second cookie and the third cookie, the clearing of the first cookie signing the first user out of the computer system.

10. The method of claim 1, wherein the computer system is a multi-tenant computer system.

11. The method of claim 10, wherein the first sub-domain name corresponds to a tenant website hosted on the multi-tenant computer system.

12. The method of claim 1, further comprising, after the first user is identified:
   determining whether the first user is signed-in to the computer system; and
   when it is determined that the first user is not signed-in to the computer system, redirecting the first sign-on request to a sign-on service.

13. A method for sign-on and sign-out for a computer system, the method comprising:

on a server computer, receiving a first sign-on request for the computer system;
obtaining, from the first sign-on request, a first user identifier, the first user identifier corresponding to a first user for the computer system;
obtaining, from the first sign-on request, a first uniform resource locator (URL);
determining whether the first URL includes a first root name for the computer system;
when a determination is made that the first URL does not include the first root name for the computer system:
  obtain a first domain name from the first URL;
  issuing a first cookie, the first cookie being a cookie;
  associating the first cookie with the first domain name;
  issuing a second cookie;
  storing in the second cookie, the first domain name; and
  when the first cookie and the second cookie are issued, signing-on the first user to the computer system;
after the first user is signed into the computer system, receiving a sign-out request for the computer system;
obtaining, from the sign-out request, a second user identifier;
obtaining, from the sign-out request, a second URL;
determining whether the second user identifier is the same as the first user identifier;
determining whether the second URL includes the first root name;
when a determination is made that the second user identifier is the same as the first user identifier and when it is determined that the second URL does not include the first root name:
  obtain the second cookie from the server computer;
  obtain the first domain name from the second cookie;
  obtain the first cookie using the first domain name;
  clear the first cookie;
  determine whether the second cookie includes any additional sub-domain names for which cookies have not been cleared; and
  when a determination is made that the second cookie does not include any additional sub-domain names for which cookies have not been cleared, clear the second cookie.

14. The method of claim 13, further comprising:
on the server computer, receiving a second sign-on request for the computer system;
obtaining, from the second sign-on request, a second user identifier, the second user identifier corresponding to a second user for the computer system;
obtaining, from the second sign-on request, a second uniform resource locator (URL);
determining whether a second URL includes the first root name for the computer system;
when a determination is made that the first user identifier is the same as the second user identifier and when it is determined that the second URL does not include the first root name for the computer system:
  obtaining a second domain name from the second URL;
  determining that the second URL is not the same as the first URL; and
  when it is determined that the second URL is not the same as the first URL:
    issuing a third cookie;
    associating the third cookie with the second domain name; and
    storing the second domain name in the second cookie.

15. The method of claim 14, further comprising:
receiving a sign-out request for the computer system;
obtaining, from the sign-out request, a third user identifier;
obtaining, from the sign-out request, a third URL;
determining whether the third user identifier is the same as the first user identifier;
determining whether the third URL includes the first root name;
when a determination is made that the third user identifier is the same as the first user identifier and when it is determined that the third URL does not include the first root name:
  obtain the second cookie from the server computer;
  obtain the first domain name from the second cookie;
  obtain the first cookie using the first domain name;
  clear the first cookie;
  obtain the second domain name from the second cookie;
  obtain the third cookie from the second domain name; and
  clear the third cookie.

16. The method of claim 13, further comprising sending a notification to a client computer when the first cookie is cleared, the notification being an image that is displayed on the client computer, the image indicating that the first user has been signed out of the computer system.

17. The method of claim 13, further comprising receiving a sign-out request from a web service.

18. The method of claim 13, wherein the first cookie includes the first user identifier, the first domain name and a cryptographic representation of the first user identifier.

19. A computer readable storage memory comprising instructions that, when executed by an electronic computing device, cause the electronic computing device to:
receive a first sign-on request for a computer system;
obtain, from the first sign-on request, a first user identifier, the first user identifier corresponding to a first user for the computer system;
obtain, from the first sign-on request, a first uniform resource locator (URL);
determine whether the first URL includes a first root name for the computer system;
when a determination is made that the first URL includes the first root name for the computer system:
  issue a first cookie, the first cookie being a cookie;
  associate the first cookie with the first user;
  obtain a first sub-domain name from the first URL;
  issue a second cookie, the second cookie being different from the first cookie;
  associate the second cookie with the first sub-domain name; and
  when the first cookie and the second cookie are issued, sign-on the first user to the computer system;
when a determination is made that the first URL does not include the first root name for the computer system:
  obtain a first domain name from the first URL;
  issue a third cookie;
  associate the third cookie with the first domain name;
  issue a fourth cookie;
  store in the fourth cookie, the first domain name; and
  when the third cookie and the fourth cookie are issued, sign-on the first user to the computer system;
receive a sign-out request for the computer system;
obtain, from the sign-out request, a second user identifier;
obtain, from the sign-out request, a second URL;
determine whether the second user identifier is the same the first user identifier;
determine whether the second URL includes a second root name;

when a determination is made that the second user identifier is the same as the first user identifier and when a determination is made that the second root name is the same as the first root name, clear the first cookie, the clearing of the first cookie signing the first user out of the computer system; and when a determination is made that the second user identifier is the same as the first user identifier and when it is determined that the second URL does not include the first root name:
  obtain the fourth cookie;
  obtain the first domain name from the fourth cookie;
  obtain the third cookie using the first domain name;
  clear the third cookie;
  determine whether the fourth cookie includes any additional sub-domain names for which cookies have not been cleared; and
  when a determination is made that the fourth cookie does not include any additional sub-domain names for which cookies have not been cleared, clear the fourth cookie.

20. A method for sign-on and sign-out for a computer system, the method comprising:
  on a server computer, receiving a first sign-on request for the computer system;
  obtaining, from the first sign-on request, a first user identifier, the first user identifier corresponding to a first user for the computer system;
  obtaining, from the first sign-on request, a first uniform resource locator (URL);
  determining whether the first URL includes a first root name for the computer system;
  when a determination is made that the first URL does not include the first root name for the computer system:
    obtain a first domain name from the first URL;
    issuing a first cookie, the first cookie being a cookie;
    associating the first cookie with the first domain name;
    issuing a second cookie;
    storing in the second cookie, the first domain name;
    when the first cookie and the second cookie are issued, signing-on the first user to the computer system;
  on the server computer, receiving a second sign-on request for the computer system;
  obtaining, from the second sign-on request, a second user identifier, the second user identifier corresponding to a second user for the computer system;
  obtaining, from the second sign-on request, a second uniform resource locator (URL);
  determining whether a second URL includes the first root name for the computer system;
  when a determination is made that the first user identifier is the same as the second user identifier and when it is determined that the second URL does not include the first root name for the computer system:
    obtaining a second domain name from the second URL;
    determining that the second URL is not the same as the first URL; and
    when it is determined that the second URL is not the same as the first URL:
      issuing a third cookie;
      associating the third cookie with the second domain name; and
      storing the second domain name in the second cookie.

21. The method of claim 20, further comprising:
  receiving a sign-out request for the computer system;
  obtaining, from the sign-out request, a third user identifier;
  obtaining, from the sign-out request, a third URL;
  determining whether the third user identifier is the same as the first user identifier;
  determining whether the third URL includes the first root name;
  when a determination is made that the third user identifier is the same as the first user identifier and when it is determined that the third URL does not include the first root name:
    obtain the second cookie from the server computer;
    obtain the first domain name from the second cookie;
    obtain the first cookie using the first domain name;
    clear the first cookie;
    obtain the second domain name from the second cookie;
    obtain the third cookie from the second domain name; and
    clear the third cookie.

* * * * *